United States Patent
Menjak et al.

(10) Patent No.: US 6,799,654 B2
(45) Date of Patent: Oct. 5, 2004

(54) HAND WHEEL ACTUATOR

(75) Inventors: Ratko Menjak, Frankenmuth, MI (US); Jens Haupt, Oberursel (DE); Jim M. Card, Light Houe Point, FL (US); Steven M Thomas, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 87 days.

(21) Appl. No.: 10/068,703

(22) Filed: Feb. 5, 2002

(65) Prior Publication Data

US 2003/0146037 A1 Aug. 7, 2003

(51) Int. Cl.⁷ .............................. B62D 5/06
(52) U.S. Cl. .................................. 180/402
(58) Field of Search ............. 180/402, 444, 180/446

(56) References Cited

U.S. PATENT DOCUMENTS

| | | | | |
|---|---|---|---|---|
| 4,623,031 A | * | 11/1986 | Drutchas et al. | 180/428 |
| 4,686,433 A | * | 8/1987 | Shimizu | 318/50 |
| 4,771,846 A | * | 9/1988 | Venable et al. | 180/422 |
| 4,924,722 A | | 5/1990 | Bacardit et al. | |
| 5,097,917 A | * | 3/1992 | Serizawa et al. | 180/402 |
| 5,201,380 A | * | 4/1993 | Callahan | 180/403 |
| 5,202,616 A | | 4/1993 | Yagi et al. | |
| 5,247,441 A | * | 9/1993 | Serizawa et al. | 701/41 |
| 6,097,286 A | * | 8/2000 | Discenzo | 340/465 |
| 6,098,296 A | * | 8/2000 | Perisho et al. | 33/203 |
| 6,138,788 A | * | 10/2000 | Bohner et al. | 180/405 |
| 6,176,341 B1 | * | 1/2001 | Ansari | 180/402 |
| 6,220,385 B1 | * | 4/2001 | Bohner et al. | 180/403 |
| 6,415,215 B1 | * | 7/2002 | Nishizaki et al. | 701/70 |
| 6,419,043 B1 | * | 7/2002 | Duval et al. | 180/444 |
| 6,481,526 B1 | * | 11/2002 | Millsap et al. | 180/402 |
| 6,523,637 B1 | * | 2/2003 | Nakano et al. | 180/402 |
| 6,547,029 B2 | * | 4/2003 | Peppler et al. | 180/402 |
| 6,547,031 B1 | | 4/2003 | Magnus | |
| 6,550,565 B2 | * | 4/2003 | Thomas et al. | 180/402 |
| 6,554,095 B2 | * | 4/2003 | Zheng et al. | 180/402 |
| 6,557,662 B1 | * | 5/2003 | Andonian et al. | 180/402 |
| 6,575,263 B2 | * | 6/2003 | Hjelsand et al. | 180/402 |
| 6,585,540 B2 | | 7/2003 | Gutierrez et al. | |

FOREIGN PATENT DOCUMENTS

| | | |
|---|---|---|
| DE | 100 51 187 | 1/2002 |
| WO | 01/55617 | 8/2001 |
| WO | 02/34609 | 5/2002 |

OTHER PUBLICATIONS

European Search Report dated Feb. 27, 2004, four pages.

* cited by examiner

Primary Examiner—Lesley D. Morris
Assistant Examiner—Paul Royal
(74) Attorney, Agent, or Firm—Michael D. Smith (57) ABSTRACT

A steering shaft supported by bearings has an end suitable for attaching a hand wheel thereto. A position sensor detects the angular displacement of the steering shaft from a central position and produces a signal indicative of such angular displacement. An electric motor and a transmission apply torque to the steering shaft to provide force-feedback to a user. A variable stopper is configured to stop rotation of the steering shaft at an arbitrary location.

17 Claims, 11 Drawing Sheets

HAND WHEEL ACTUATOR

TECHNICAL FIELD

The invention relates to a hand wheel actuator for a steer-by-wire system of an automobile.

BACKGROUND

Automobiles are conventionally equipped with a pair of front road wheels that are steered to enable the vehicle to turn left and right as it maneuvers on land. It is also known to provide actuators for steering rear wheels in automobiles. In the past, vehicle steering systems commonly employed a mechanical connection between the driver-operated hand wheel and the front road wheels of an automotive vehicle. As the driver rotated the hand wheel, a mechanical linkage through the vehicle's tie-rods actuated the road wheels sometimes with the assistance of a power assist steering motor or hydraulic piston.

Recently, steer-by-wire steering systems have been introduced into automotive vehicles to provide road wheel steering function. Included in a typical steer-by-wire steering system is a hand wheel actuator for monitoring the angular position of the steering wheel, and road wheel motor actuators which are controlled by controllers in response to tracking the sensed angular displacement of the hand wheel from a central position. In contrast to prior steering systems, the steer-by-wire steering system does not employ a mechanical linkage between the steering wheel and the individual road wheels. Exemplary of such known steer-by-wire systems is commonly-assigned U.S. Pat. No. 6,176,341, issued Jan. 23, 20001 to Ansari.

Because there is no mechanical linkage between the hand wheel and road wheels in a steer-by-wire system, steering enhancements such as variable-ratio steering are easily implemented to improve the drivability of the vehicle. However, when variable-ratio steering is implemented, the extreme left and extreme right limits of steering do not consistently correspond with the extreme left and extreme right limits of the road wheels. For example, if the hand to road wheel steering ratio is decreased for traveling at low speeds, e.g., in a parking lot situation, the driver need not rotate the hand wheel as far as he or she would if variable ratio steering was not implemented. In this case, the road wheels will reach the limit of their steering capability before the hand wheel does since the positive travel end stop is fixed to correspond with the highest hand wheel to road wheel turning ratio. It would therefore be desirable to provide feedback to the driver when the road wheels have reached their steering limit. Ideally, such a mechanism would allow the variable ratio steering to stop the travel of the hand-wheel at any point where the road wheels have reached their steering limit.

SUMMARY

The above-discussed and other drawbacks and deficiencies of the prior art are overcome or alleviated by providing a hand wheel actuator for providing force feedback to a user. The actuator comprises a steering shaft that is supported by bearings and has an end suitable for attaching a hand wheel thereto; a position sensor detecting the angular displacement of the steering shaft from a central position and producing a signal indicative of such angular displacement; an electric motor and a transmission applying torque to the steering shaft to provide force-feedback to a user; and a variable stopper configured to stop rotation of the steering shaft at an arbitrary location. The above-discussed and other features and advantages of the present invention will be appreciated and understood by those skilled in the art from the following detailed description and drawings.

BRIEF DESCRIPTION OF THE DRAWINGS

The present invention will now be described by way of example with reference to the accompanying drawings, in which.

DETAILED DESCRIPTION OF THE PREFERRED EMBODIMENTS

Figures 1, 2:
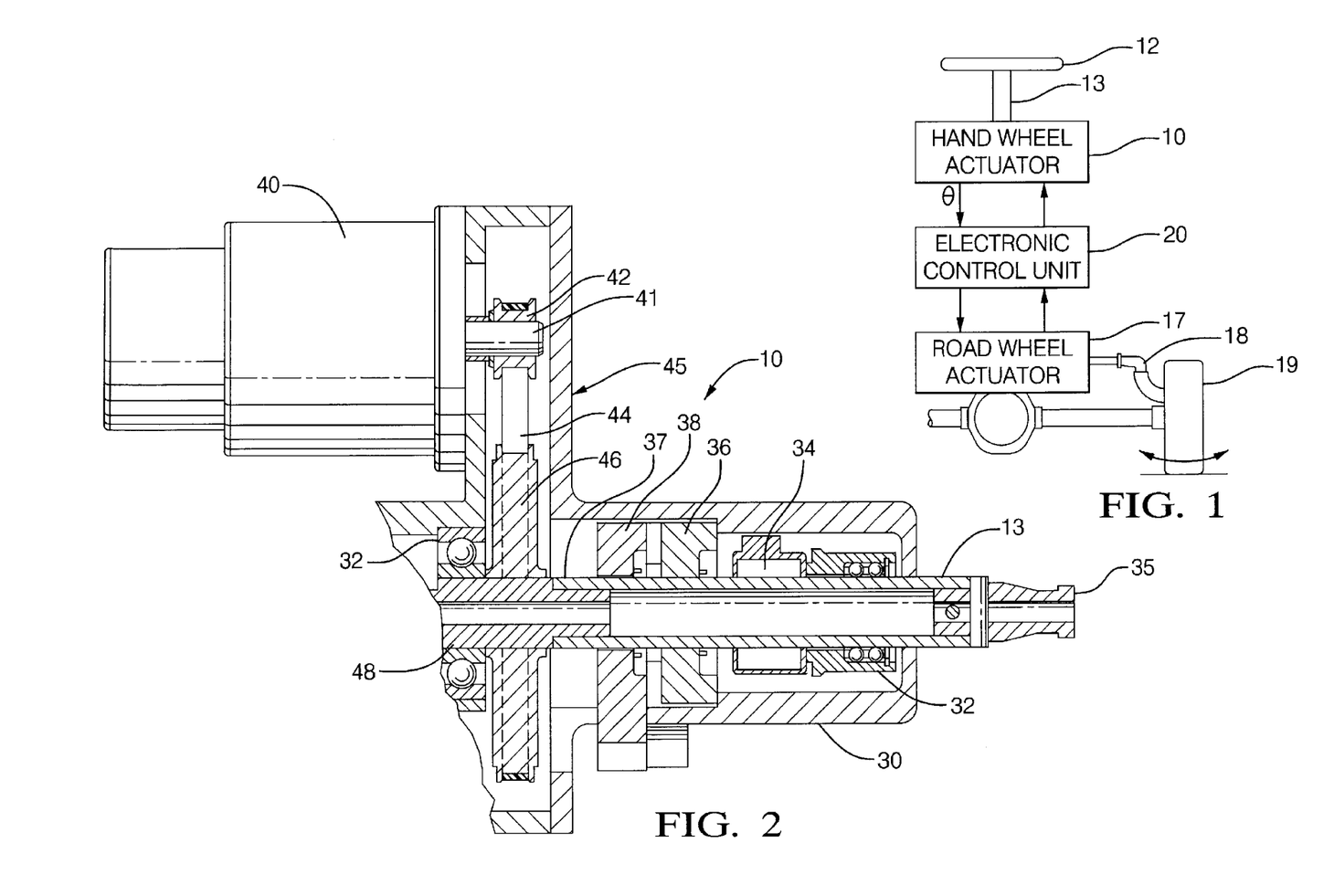
FIG. 1 shows a schematic overview of a steer-by-wire system.
FIG. 2 shows some important components of the hand wheel actuator common to most embodiments.

FIG. 1 shows a schematic overview of an exemplary steer-by-wire system for a vehicle. Driver input is made to hand wheel 12, which is connected by upper shaft 13 to hand wheel actuator 10. Hand wheel actuator 10 includes redundant position sensors for detecting the angular displacement of hand wheel 12. The position sensor output is directed to electronic control unit 20, which includes a microprocessor and other assorted electronic components well known in the field of electronic control for providing memory, input/output, and processing functions. Electronic control unit 20 receives signals from hand wheel position sensors in hand wheel actuator 10 and determines what signals, if any, to send to road wheel actuator 17 so that the position of road wheels 19 (only one shown) correspond with the position of hand wheel 12. Road wheel actuator 17 controls the steering position of road wheels 19 by means of a tie-rod 18.

Road wheel actuator 17 includes torque or strain sensors to measure force required by road wheel actuator 17 to rotate and maintain road wheels 19 in their desired position. Output from road wheel torque sensors (not shown) is transmitted to electronic control unit 20, which then transmits driver feedback information to hand wheel actuator 10. Hand wheel actuator 10 includes an electric motor or other actuator to provide force-feedback to steering wheel 12, thus giving the driver feedback as to the road conditions. Hand wheel actuator 10 may also include a torque sensor for providing a signal to the electronic control unit to ensure that the driver is receiving the correct amount of driver feedback.

Figures 14, 15:
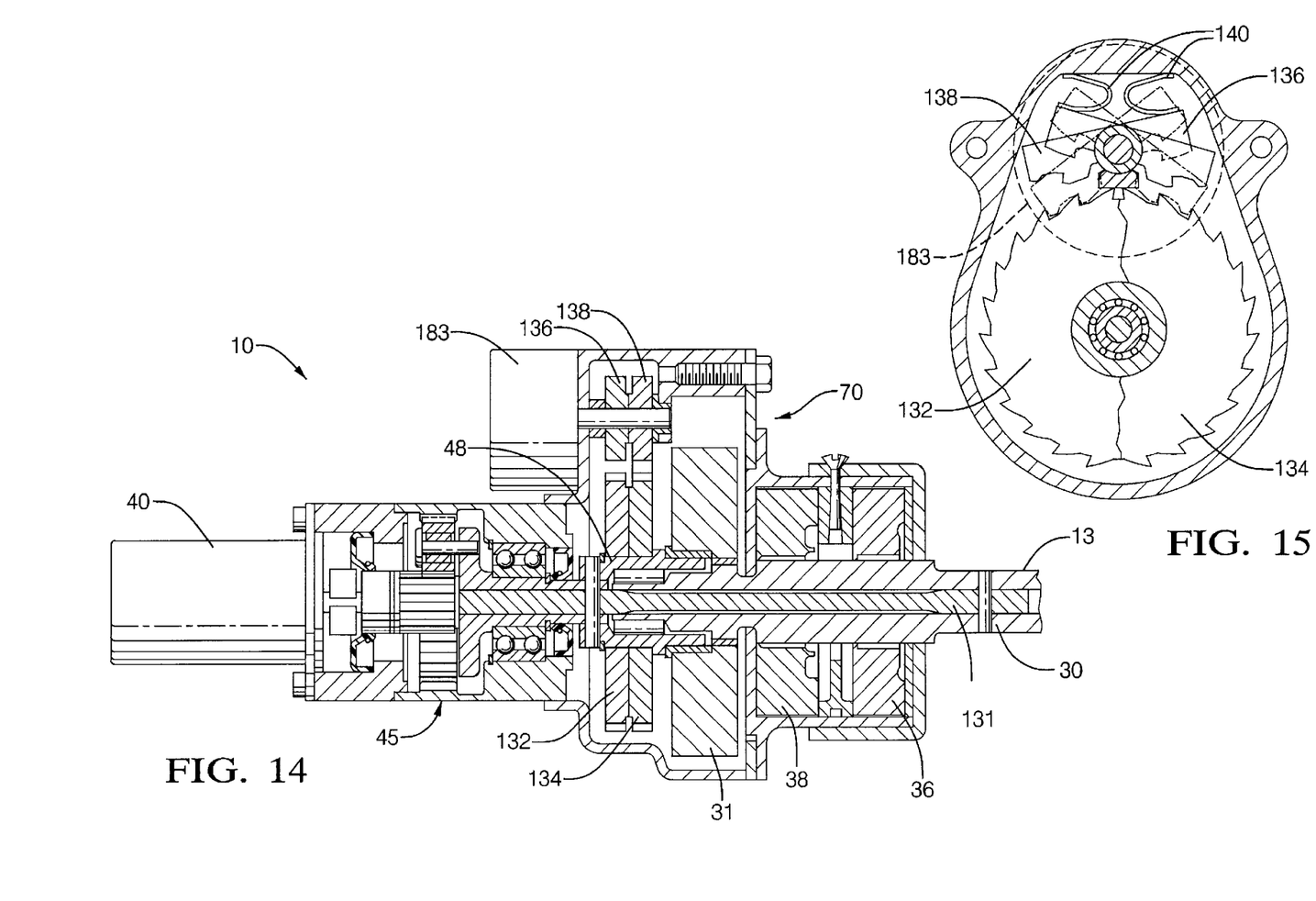
FIG. 14 shows a tenth embodiment using a pawl and ratchet stopper.
FIG. 15 shows a cross section of FIG. 14 taken along lines A—A thereof.

Some important components of hand wheel actuator 10 common to all preferred embodiments are shown in FIG. 2. Hand wheel actuator 10 comprises a housing 30, which supports upper shaft 13 and lower shaft via roller bearings 32. Upper shaft 13 and lower shaft 48 are fixed with respect to each other and form a steering shaft. Redundant position sensors 36 and 38 transmit signals representing hand wheel angular displacement to control unit 20 (FIG. 1). Non-compliant torque sensor 34 detects the torque in upper shaft 13 between a first end 35, which is connected with hand wheel 12 (FIG. 1) and a second end 37, which is connected to pulley 46 mounted on a lower shaft 48 which is fixed to upper shaft 13. As an alternative to non-compliant torque sensor 34, a conventional torque sensor utilizing a torsion bar as shown in FIG. 14 may be used as well. Motor 40 receives electric power from electronic control unit 20 (FIG. 1) which drives motor 40 in response to hand wheel actuator and road wheel actuator sensor input. Motor 40 includes output shaft 41, which drives small pulley 42. A belt 44 connects small pulley 42 with pulley 46. While a belt drive transmission is shown here, it is to be understood that any other type of power transmission can be easily implemented, such as chain drive, gearing, and the like.

Figure 3:
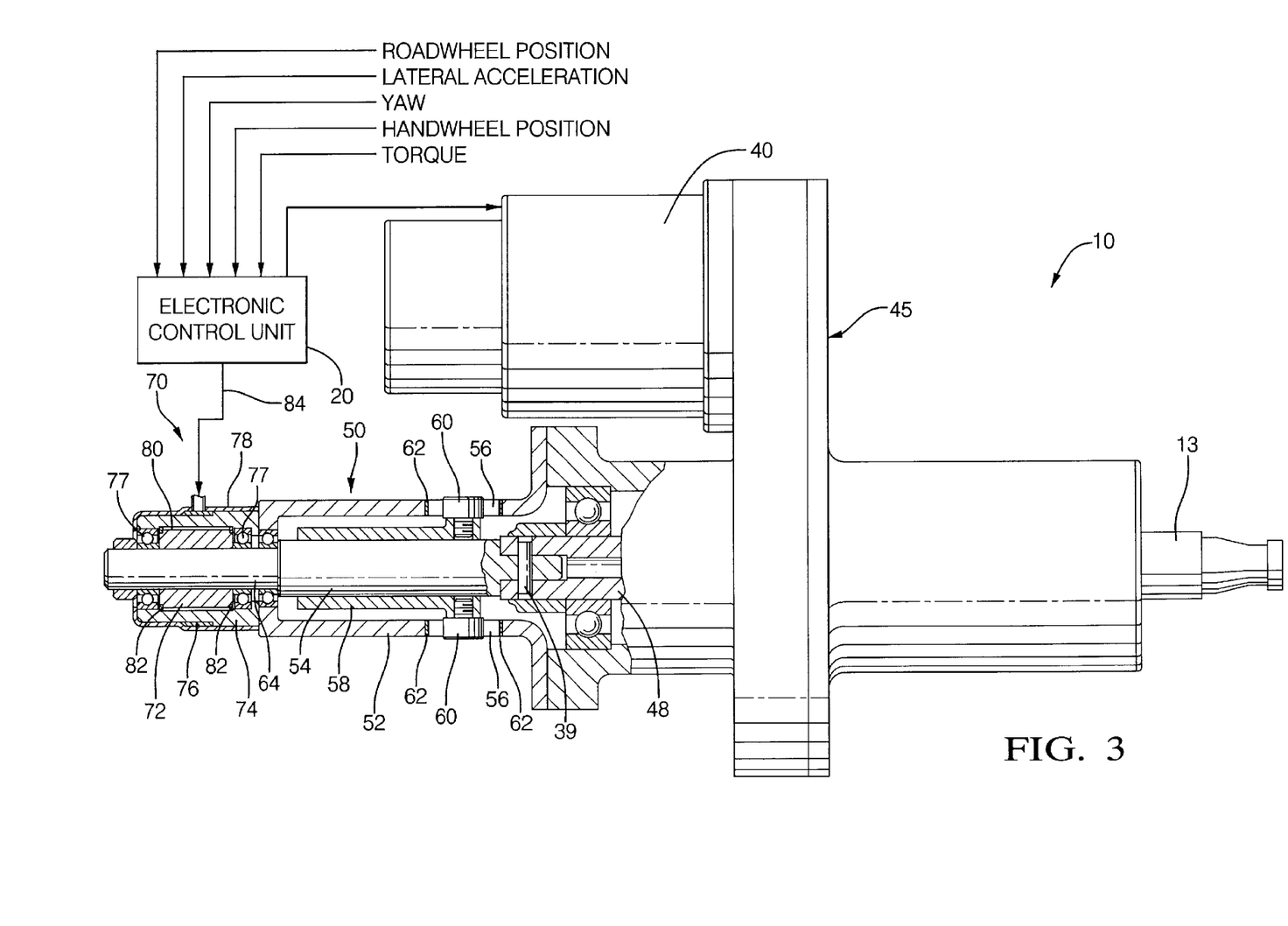
FIG. 3 shows a first embodiment which employs a magnetic rheological fluid stopper on the steering shaft.

FIG. 3 shows a first preferred embodiment of a hand wheel actuator having a means for varying hand wheel travel limits, including positive travel end stop 50 and variable stopper 70. Positive travel end stop 50 comprises a ball screw 54 connected to lower shaft 48 by pin 39. Ball nut 58 engages ball screw 54 and travels linearly along the axis of ball screw 54. Rotation of ball nut 58 is prevented by locator screws 60, which slide in slots 56 formed in housing 52. Bumpers 62 are provided in slots 56 to provide rapidly increased resistance at the positive travel limits, providing an improved feel to the driver.

In operation, as the driver rotates hand wheel 12 (FIG. 1), upper shaft 13 is rotated. Torque and position sensors (FIG. 2) produce sensor output, which is provided to electronic control unit 20, which powers electric motor 40. Motor 40 rotates lower shaft 48 over a mechanical transmission 45, such as belt 44 (FIG. 2), thus providing force-feedback to the driver. As lower shaft 48 is rotated, ball screw 54 rotates, which causes ball nut 58 to move linearly left and right as seen in FIG. 3. Locator screws 60 and slots 56 cooperate to limit the left and right movement of ball nut 58, thus providing a positive stop to upper shaft 13. In a preferred embodiment, positive travel end stop 50 limits rotation of upper shaft 13 to plus or minus 540°, or one and one-half rotation from the central position shown.

Variable stopper 70 comprises a magnetic rheological fluid (MRF) damper, which includes a rotor 72, a stator 74, wiring 76, and housing 78. Rotor 72 is fixed to and moves with ball screw extension 64 of ball screw 54. Bearings 77 support stator 74 and variable stopper housing 78. In the annular space between rotor 72 and stator 74 is rheological fluid 80. For example, rheological fluid 80 may consist of a magnetic rheological fluid, comprising iron particles or filings suspended in oil. Gaskets 82 positioned at either end of rheological fluid 80 prevent it from leaking. When current is applied to wiring 76, particles in rheological fluid 80 collimate and apply friction between rotor 72 and stator 74, effectively stopping rotation of rotor 72.

In operation, when road wheels 19 (FIG. 1) reach the limit of their turning capability and hand wheel has not, e.g., during variable-ratio steering operation, the steering wheel can be stopped by electronic control unit 20 by passing current through wiring 76. When torque sensor 34 detects that the driver is turning the wheel back towards center, electronic control unit 20 responds by cutting power to wiring 76 in variable stopper 70. Control unit 20 can also be programmed to advantageously employ variable stopper 70 in other situations. For example, hand wheel 12 may be advantageously stopped while responding to excessive yaw, lateral acceleration, understeer, oversteer, etc. Variable stopper can protect against overturning the vehicle, preventing additional rotation of the steering wheel at high speeds where the wheels start to lose traction or to prevent the vehicle from overturning.

Resistance generated by rheological fluid 80 may be selected such that it may be overcome by the driver or not. Furthermore, a variable-resistance MRF device may be employed for varying the resistance depending upon the circumstances. For example, a high resistance may be applied when the driver is at the limit of road wheel movement, but a lower resistance may be applied in other situations, such as during emergency over-steering correction by electronic control unit 20 in response to yaw and lateral acceleration inputs. Rheological fluid dampers are known to provide strong resistance in very short periods of time, e.g., about one tenth of a second, although faster responses are possible.

Figure 4:
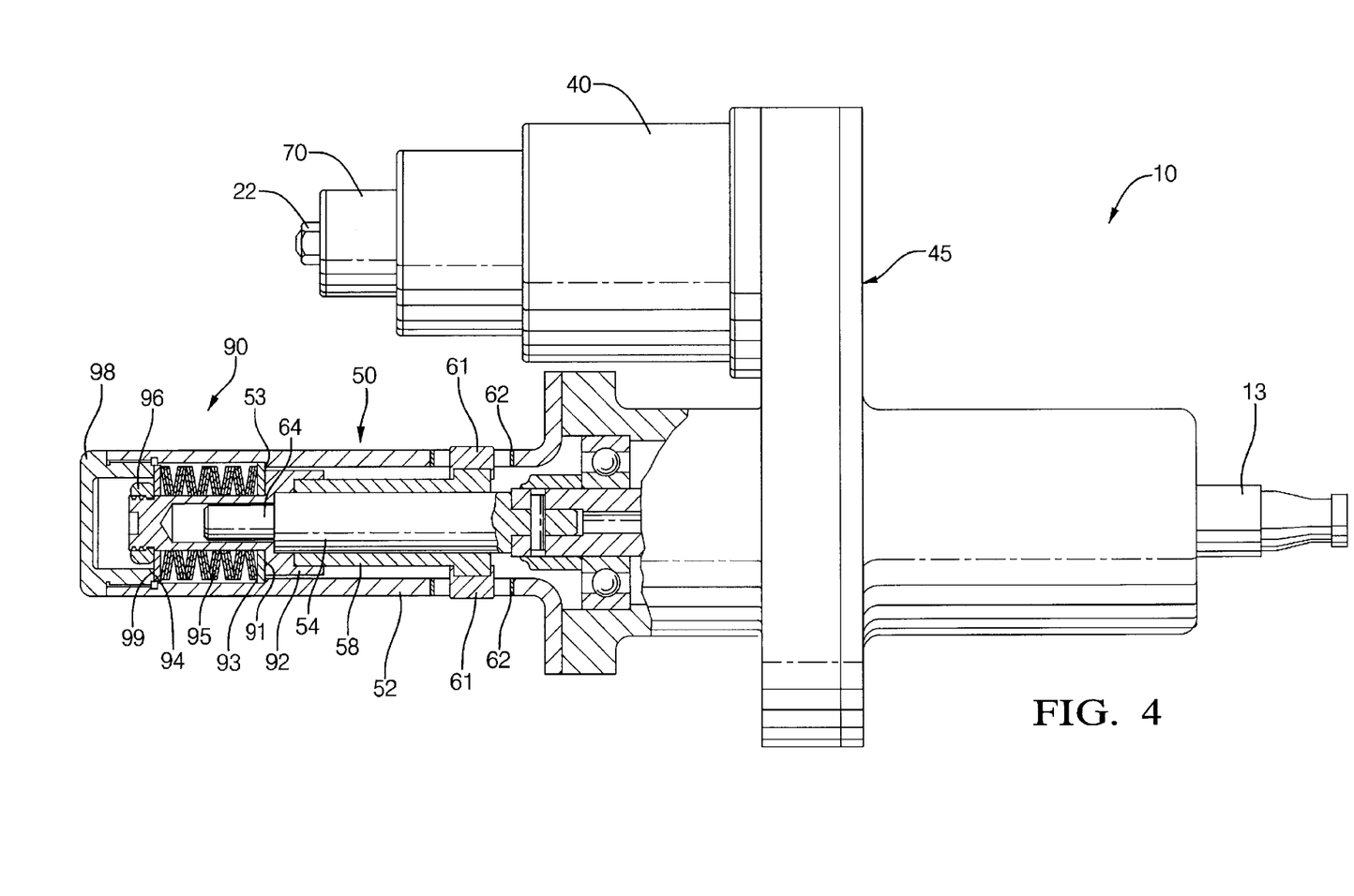
FIG. 4 shows a second embodiment which employs a magnetic rheological fluid stopper on the feedback motor shaft.

FIG. 4 shows a second embodiment wherein the hand wheel actuator 10 is similar to the embodiment shown in FIG. 3 with the exception that variable stopper 70 is positioned over motor shaft 22 instead of ball screw extension 64. In FIG. 4, variable stopper 70 is integrated with electric motor 40. Because of the increased turning ratio resulting from transmission 45 (see FIG. 2) a smaller variable stopper can be used to generate the same amount of stop-torque felt at hand wheel 12 (FIG. 1) than in the previous embodiment.

As another advantage of placing variable stopper 70 on motor shaft 22, the linear motion of ball nut 58 may be employed in a mechanical return-to-center device 90. Ordinarily, motor 40 is used to provide a return-to-center function, which provides the driver with a tactile feel as to where the center is, as well as to model the pull to center normally felt at the tires. However, this important tactile information can be provided by a reliable mechanical device as well.

Positive travel end stop 50 is the same as previously described with respect to the embodiment shown in FIG. 3, except in this case, locators 61 take the place of locator screws 60, and spring 95 is connected to ball nut 58 by spring adaptor 92. Spring 95 is constrained between spring washers 93 and 94. Spring washer 93 is limited from moving right as seen in FIG. 4 by either shoulder 91 of spring adapter 92 or shoulder 53 of housing 52. Spring washer 94 is limited from moving left as seen in FIG. 4 by either nut 96 attached to an end of spring adapter 92 or lip 99 of cover 98. When ball nut 58 moves to the right from the center position shown in FIG. 4, nut 96 and spring washer 94 moves with it, while spring washer 93 remains fixed against shoulder 53 of housing 52. The spring compresses causing increased resistance the farther ball nut 58 is moved from center. On the other hand, when ball nut 58 moves left from the central position shown in FIG. 4, spring washer 93 is pushed to the left by shoulder 91 of spring adapter 92 while spring washer 94 remains fixed against lip 99 of cover 98. The spring again compresses, causing increased resistance the farther ball nut 58 is moved from center. A mechanical return-to-center device 90 such as described will provide some feedback to a driver even in the case of a failure of either motor 40 or transmission 45. A soft center can be provided by adding bumpers or rubber washers (not shown).

Figures 5, 6:
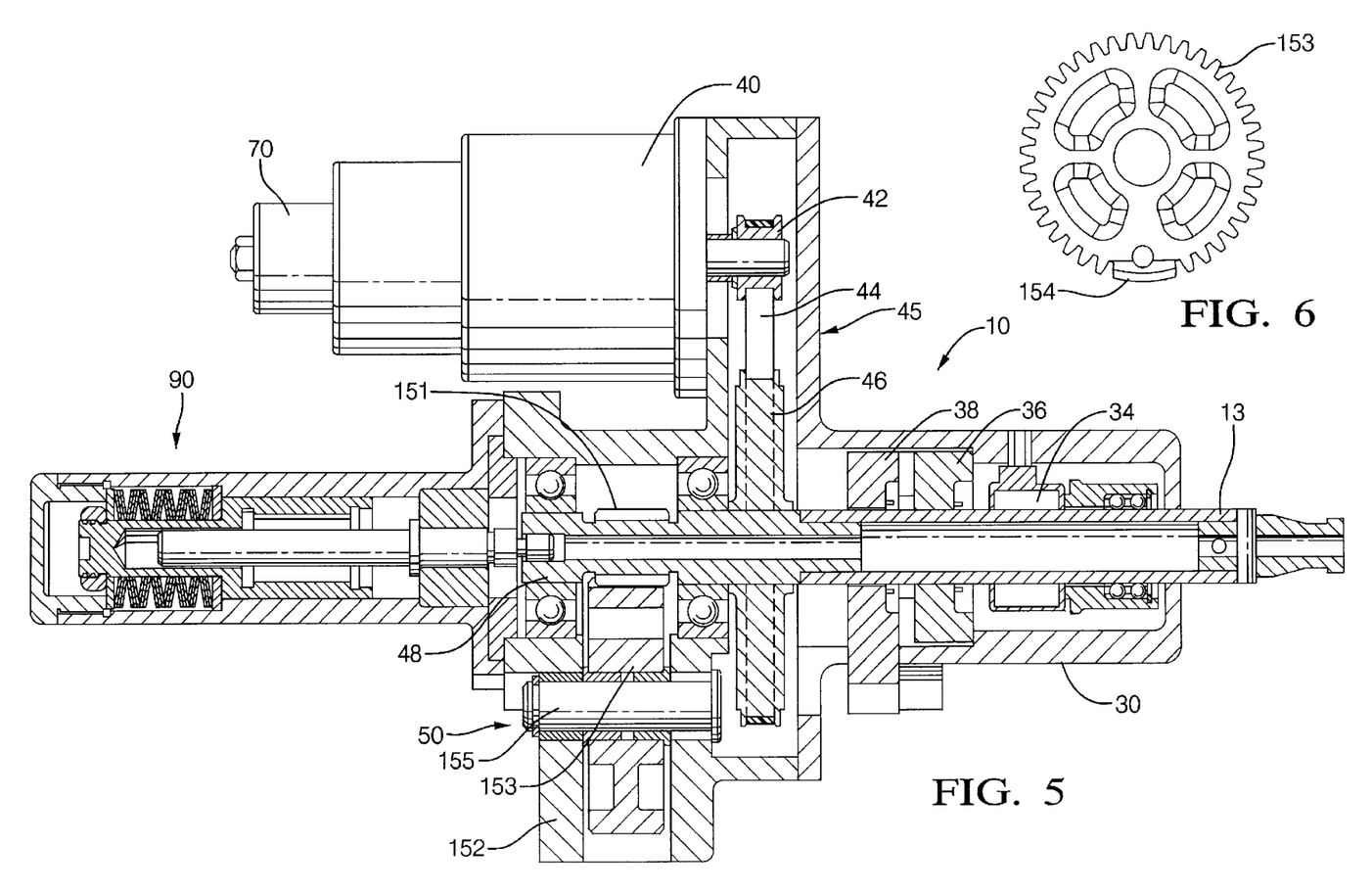
FIG. 5 shows a third embodiment in which a gearing positive travel end stop is employed.
FIG. 6 shows a plan view of a gear of the third embodiment.

FIGS. 5 and 6 show a third embodiment wherein positive travel end stop 50 is configured as a gear stop rather than a ball nut stop. Here, pinion 151 is formed integrally with or fixed to lower shaft 48. Pinion 151 interacts with gear 153, which is rotatably mounted on shaft 155, which is supported by housing 152, which is attached to or formed with housing 30.

Gear 153 includes at least one stop tooth 154 (FIG. 6), which stops rotation of pinion 151 at the limits of travel of pinion 151 and lower shaft 48. This provides the positive end stop function. Preferably, pinion 151 and gear 153 are sized and configured to allow lower shaft 48 to rotate plus or minus 540° (one and one-half rotation) before reaching the travel limit.

Figure 7:
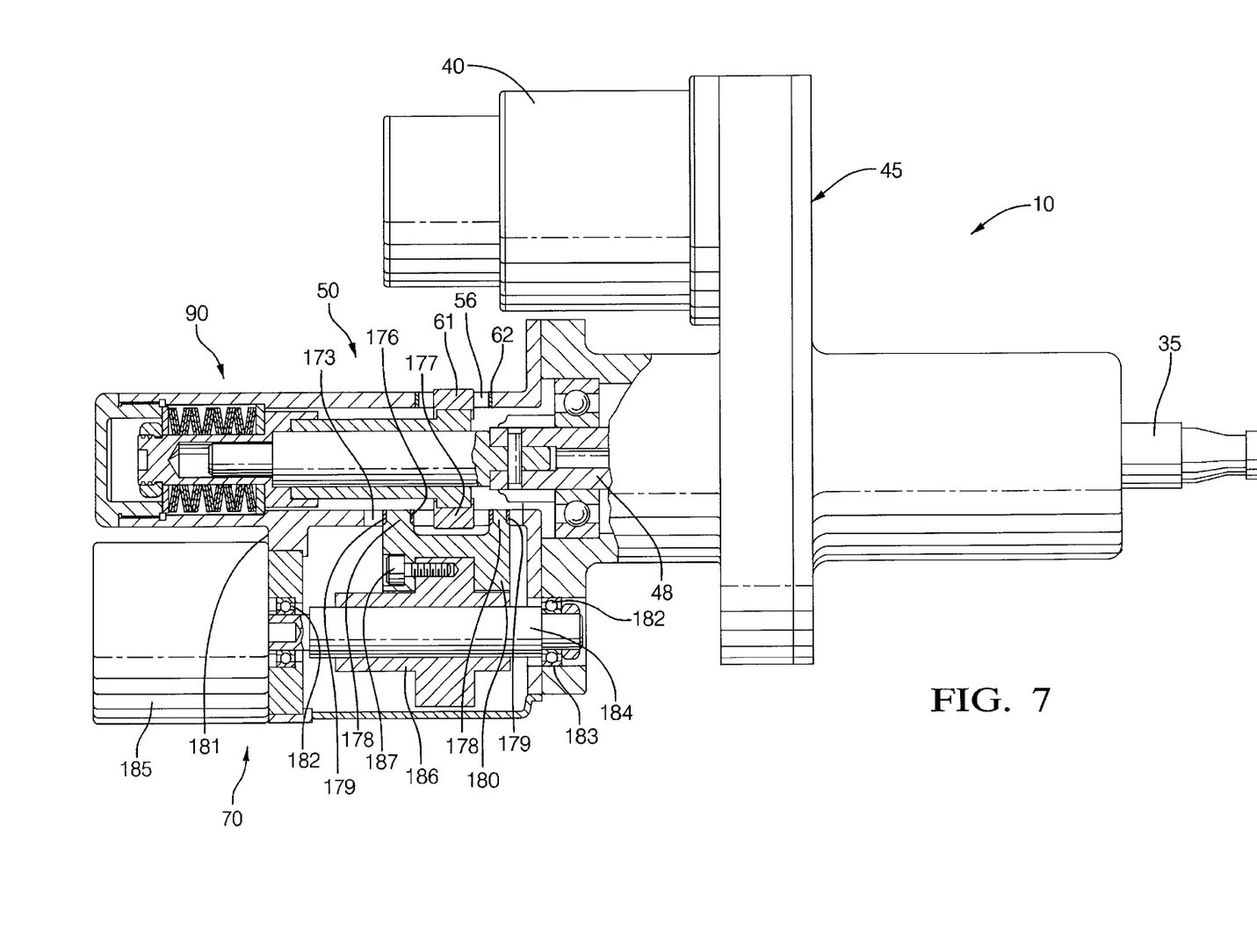
FIG. 7 shows a fourth embodiment having a mechanical variable stop locator mounted to a second ball nut.

FIG. 7 shows a fourth embodiment in which variable stopper 70 is a mechanical variable stopper. In this embodiment, positive travel end stop 50 and mechanical return-to-center device 90 are as shown in FIG. 4 and described with respect thereto. However, in this embodiment, one of slots 56 is replaced with an elongated slot 160, in which is disposed a variable stop locator 180. Locator 177, which is identical to locator 61 of the previous embodiments, is positioned within stops 178 formed or disposed on variable stop locator 180. Variable stop locator 180 is fixed to stopper ball nut 186 by screw connection 187, but could also be formed integrally therewith. In response to a signal from electronic control unit 20 (FIG. 1) motor 185 rotates stopper ball screw, causing stopper ball nut 186 to move linearly left and right. Stopper ball screw 184 is supported by bearings 182.

In operation, when variable steering is activated, electronic control unit 20 actively calculates or otherwise determines, based on the changing ratio between hand wheel 12 and road wheels 19, the position of hand wheel 12 when road wheels 19 reach their turning limit. Electronic control unit 20 then moves variable stop locator 180 to that position, thus preventing hand wheel 12 from turning beyond a position corresponding to the turning limits of road wheels 19. Bumpers 176 and 179 are provided between locator 177 and variable stop locator 180, and between variable stop locator 180 and variable stop locator housing 181.

Figure 8:
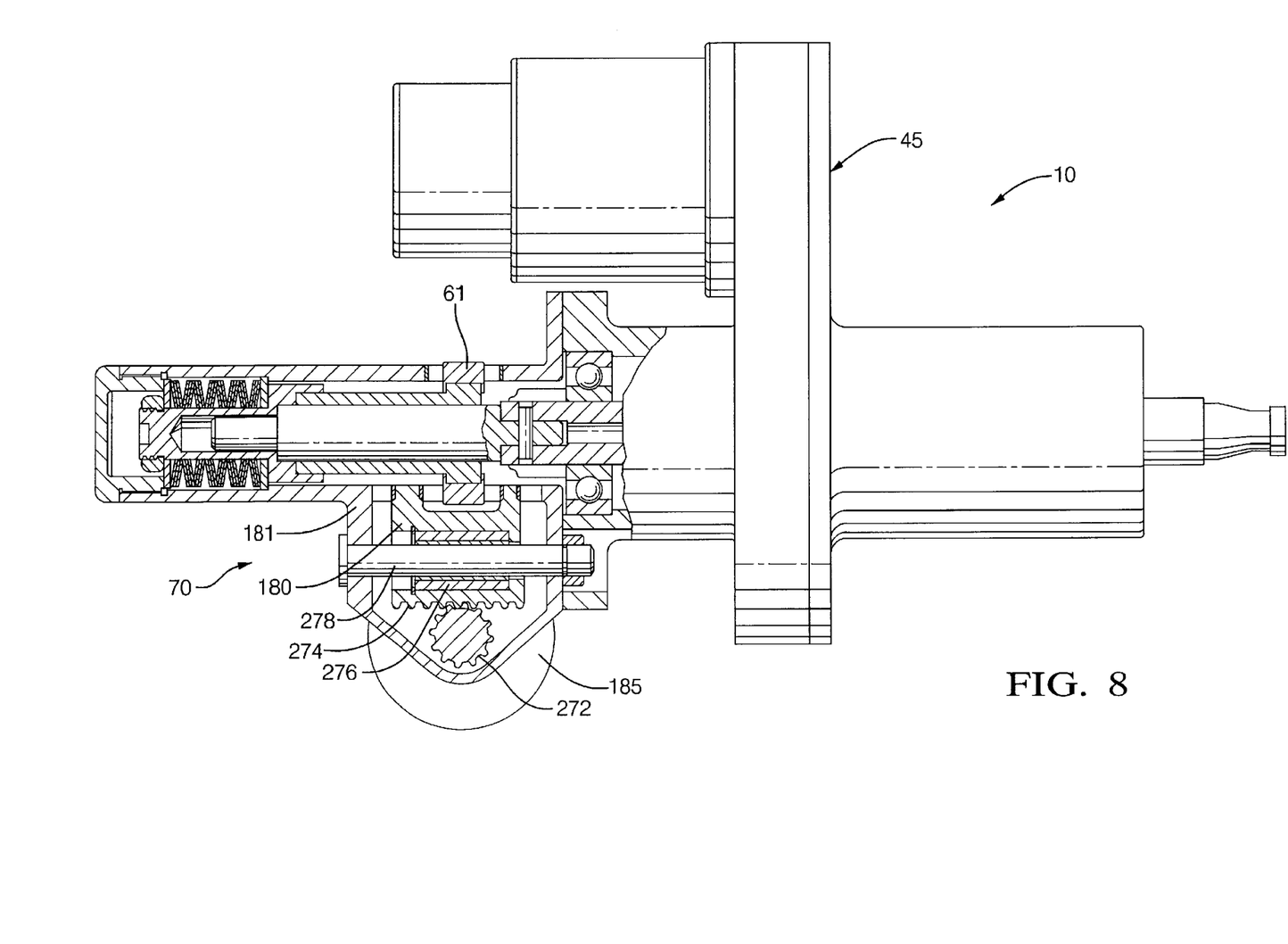
FIG. 8 shows a fifth embodiment having a mechanical variable stop locator mounted to a rack and repositioned by a motor having a pinion mounted to its output shaft.

FIG. 8 shows a fifth embodiment, similar to that shown in FIG. 7, but with a different means of transmission between motor 185 and variable stop locator 180. In this embodiment, motor 185 includes pinion 272 mounted to its output shaft. Pinion 272 interacts with rack 274 formed integrally with or otherwise attached to variable stop locator 180. Variable stop locator is mounted for limited movement, allowing it to slide back and forth on bearing 276 mounted to shaft 278. Thus, when pinion 272 rotates under influence of motor 185, variable stop locator 180 is repositioned left or right. Operation of this embodiment is the same as that described above with respect to FIG. 7.

Figure 9:
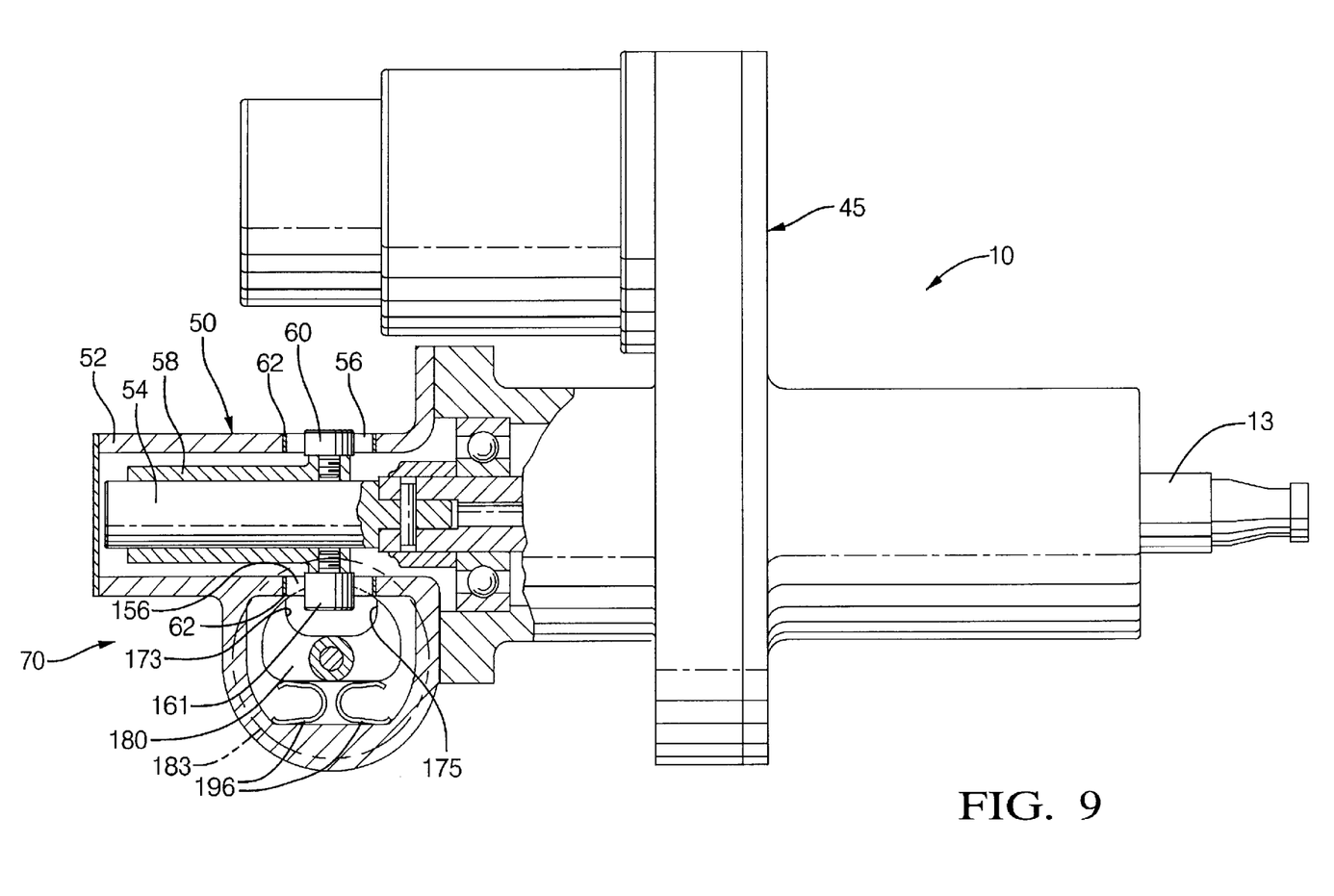
FIG. 9 shows a sixth embodiment in which the variable stop locator is mounted directly to a rotary actuator.

FIG. 9 shows a sixth embodiment employing a rotary actuator. In this case, positive travel end stop 50 is the same as previously described with respect to the embodiment shown in FIG. 3, including ball screw 54, ball nut 58. However, variable stop locator 180 is formed as a lever mounted on the output shaft of electric rotary actuator 183. Ball nut 58 has a first locator screw 60 positioned within a slot 56, in a manner similar to that described with respect to the embodiment shown in FIG. 3. A second locator screw 161 is positioned within a second slot 156 but has an elongated head so that it extends out of the second slot 156. Variable stop locator 180 includes a first surface 173 and a second surface 175 positioned on either side of second locator screw 161. When repositioned by rotary actuator 183, one of surfaces 173, 175 will be positioned at a point corresponding to a steering limit of road wheels 19, which will vary depending on the varying steering ratio. When variable steering ratio is not used, rotary actuator 183 is powered down and springs 196 will return variable stop locator 180 to the center position shown in FIG. 9.

Figure 10:
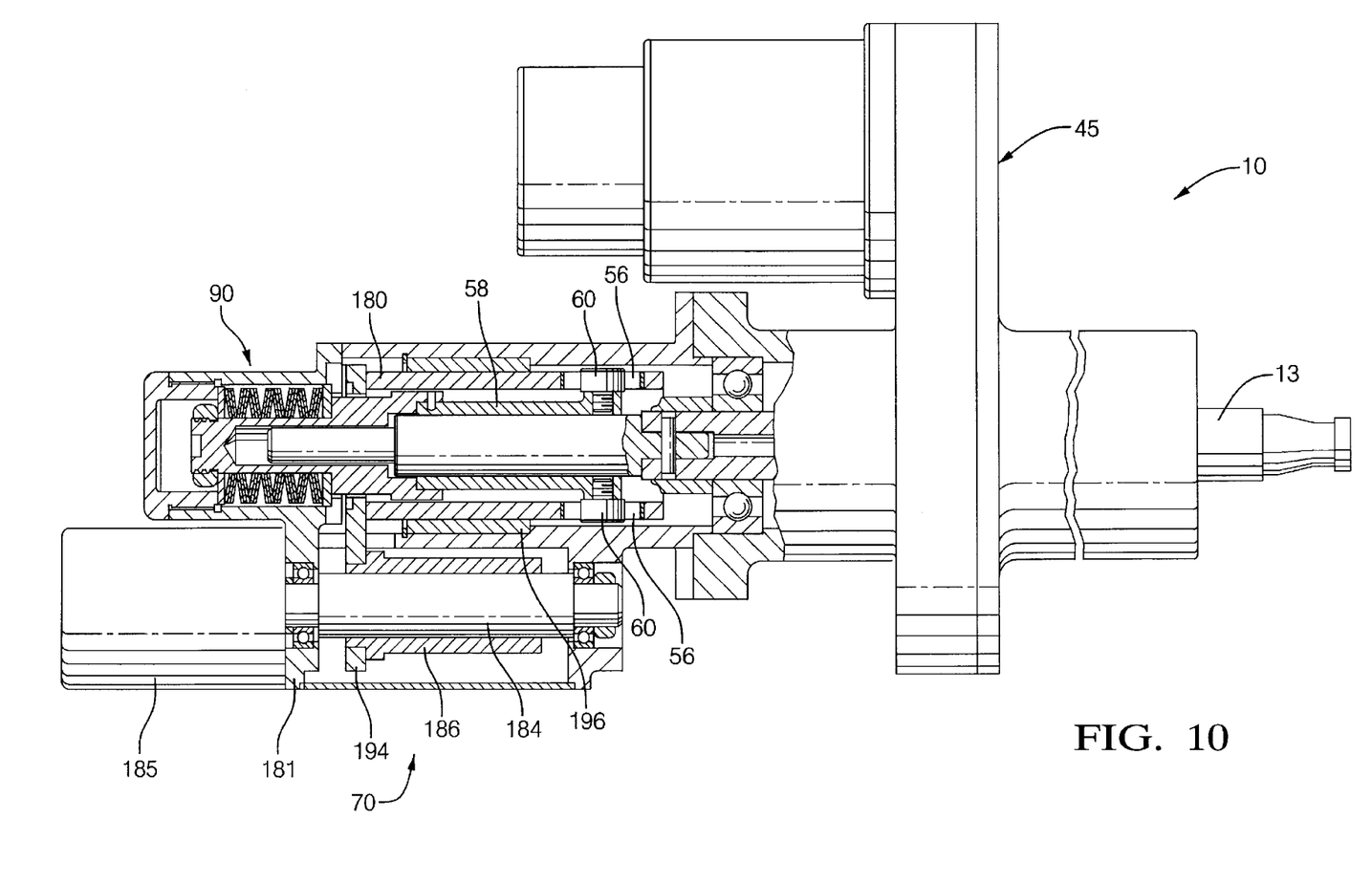
FIG. 10 shows a seventh embodiment similar to the fourth embodiment but with different construction.

FIG. 10 shows a seventh embodiment in which slots 56, instead of being formed in housing 52 as shown in FIG. 3, are formed in variable stop locator 180. Variable stop locator 180 is formed as a cylinder that extends around ball nut 58 and carries slots 56 for defining the positive end stop locations when centrally positioned as shown in FIG. 10. However, variable stop locator 180 is supported by support 194 which is carried by stopper ball nut 186. In this embodiment, motor 185 rotates stopper ball screw 184 on its axis, causing stopper ball nut 186 to slide left and right. Stopper ball nut 186 carries support 194 which supports variable stop locator 180. Thus, stopper ball nut 186, support 194, and variable stop locator 180 all move as a unit. Variable stop locator 180 has slots 56 formed therein which limit movement of locators 61 carried by ball nut 58. As upper shaft 13 is rotated by a driver, the limits of its rotation is determined by the position of variable stop locator 180, which is positioned in response to the variable steering ratio between hand wheel 12 and road wheels 19, as well as the position of hand wheel 12, by electronic control unit 20.

The function of mechanical return-to-center device 90 is the same as that described above with respect to the embodiment shown in FIG. 4. It will be understood that mechanical return-to-center device 90 can be replaced with the variable stopper 70. In this case, motor 185 will be coaxial with upper shaft 13.

Figure 11:
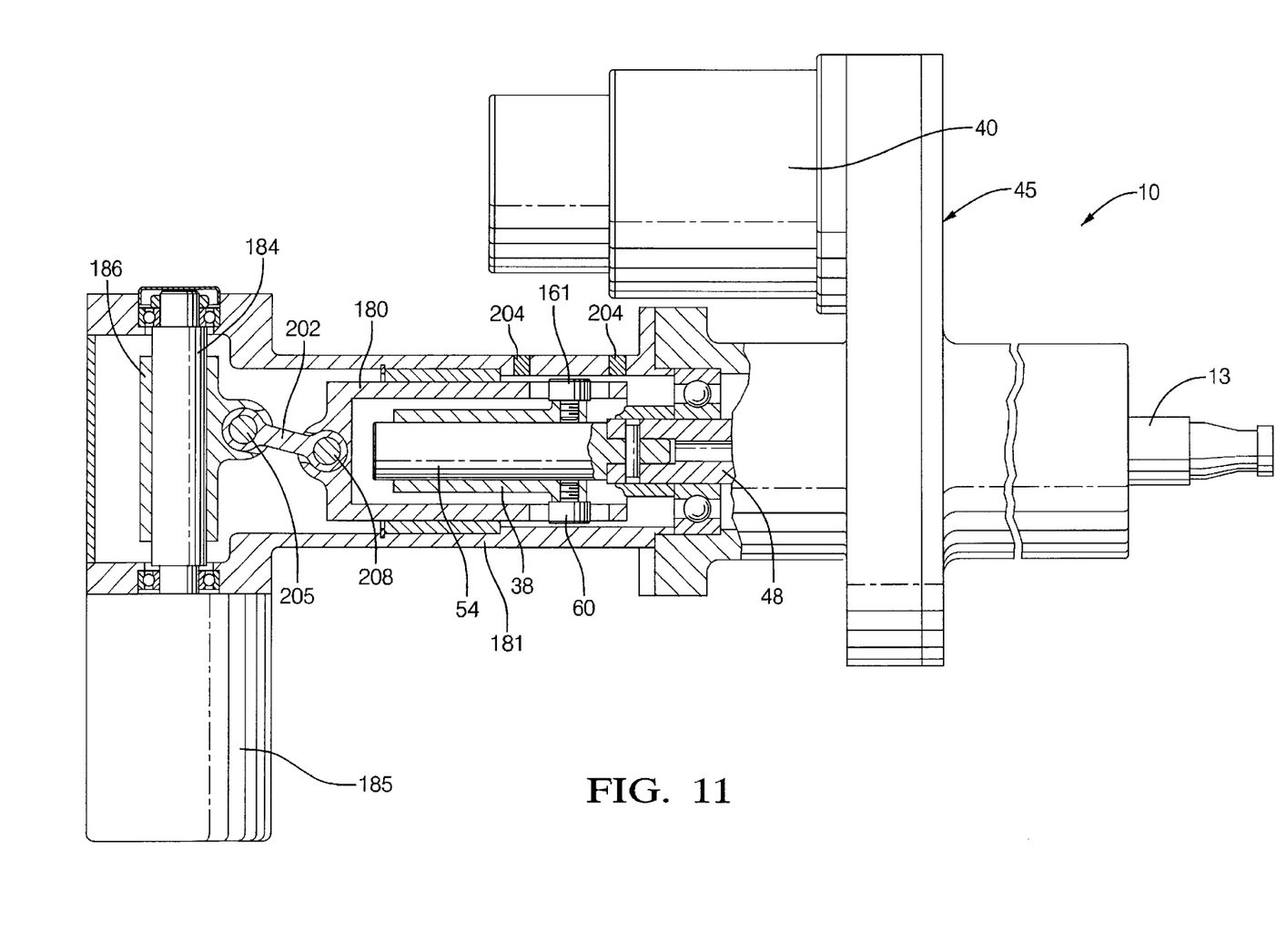
FIG. 11 shows an eighth embodiment similar to the fourth embodiment, but with the second ball nut mounted perpendicular to the steering shaft.

FIG. 11 shows an eighth embodiment having a variable stop locator 180 similar to that described above with respect to the embodiment shown in FIG. 10. In this embodiment, however, motor 185 is positioned on an axis perpendicular to the axis of upper shaft 13. Stopper ball screw 184 is attached to the output shaft of motor 185 and stopper ball nut 186 is positioned thereon and configured to move linearly up and down along stopper ball screw 184 as seen in FIG. 11. A link 202 extends from pin 205 supported on stopper ball nut 186 to a pin 208 supported by variable stop locator 180 to translate linear motion from stopper ball nut 186 to variable stop locator 180. In this way, variable stop locator 180 is repositioned as described above in previous embodiments. Ball nut 58 carries a locator screw 161 having an elongated head to interact with stoppers 204 which are fixed in place to ensure positive stop at these locations, which preferably correspond to plus and minus 540° of rotation from center, or one and one-half revolutions.

Figures 12, 13:
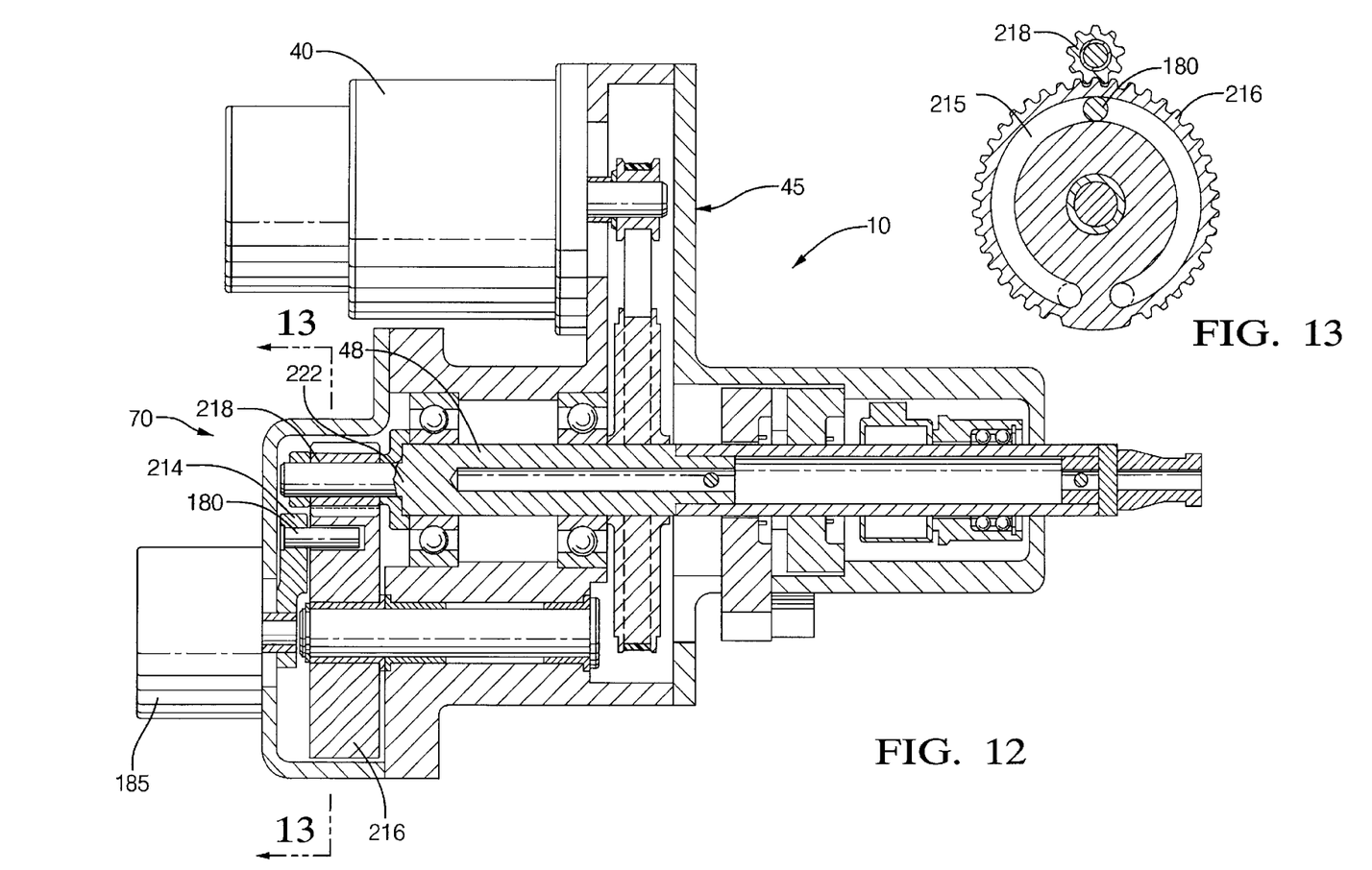
FIG. 12 shows a ninth embodiment employing a variable stopper using gearing.
FIG. 13 shows a cross section of the mechanism of FIG. 12 taken along line A—A thereof.

FIGS. 12 and 13 show a ninth embodiment of the invention. In this embodiment, lower shaft 48 carries a pinion gear 218, which interacts with a gear 216. Gear 216 rotates less than one revolution for three revolutions of pinion gear 218, and includes a slot 215 that extends coaxially around one face of gear 216 to define the positive limits of rotation when gear 216 is centrally positioned as shown in FIG. 13. Variable stop locator 180 comprises a rod that extends into slot 215. When positioned centrally within slot 215 as seen in FIG. 13, pinion gear 218 is permitted to rotate plus or minus 540°, or one and one-half revolution in either direction. Variable stop locator 180 is positioned on arm 214 which is fixed to the output shaft of motor 185. During variable ratio steering, electronic control unit 20 (FIG. 1) energizes motor 185, causing arm 214 and variable stop locator 180 to be repositioned according to the direction of steering and the selected and varying turning ratio between hand wheel 12 to road wheel 19 (FIG. 1). This permits electronic control unit 20 to prevent oversteering even during variable ratio steering as previously described.

FIGS. 14 and 15 show a tenth embodiment of the invention. In this embodiment, motor 40 is coaxial with upper shaft 13 and transmits power through transmission 45 comprising a planetary gear set. Non-compliant torque sensor 34, previously described with respect to FIG. 2, is replaced with a conventional torque sensor 31 which employs torsion bar 131 to measure strain.

Mounted to lower shaft 48 is ratchets 132, 134, which are identical except that each has teeth facing a different direction, as seen in FIG. 15 in which part of one ratchet is removed. Pawls 136, 138 are mounted to the output shaft of rotary actuator 183, each of pawls 136, 138 being aligned with a respective one of ratchets 132, 134. In operation, when electronic control unit 20 (FIG. 1) determines that road wheels 19 (FIG. 1) have reached a limit of their turning ability, it energizes rotary actuator 183 causing one of said pawls to engage one of said sprockets, thereby preventing further rotation in that direction, but allowing rotation away from the turning limit. When electronic control unit de-energizes rotary actuator 183, pawls 136, 138 return to a disengaged position under the influence of return springs 140. While pawls 136 and 138 are shown each mounted to a single rotary actuator, they could as easily be individually engaged by separate actuators, which may or may not be rotary. In this way, the steering shaft can be locked against any movement left or right, for example, as a theft-deterrent.

While preferred embodiments have been shown and described, various modifications and substitutions may be made thereto without departing from the spirit and scope of the invention. For example, while the hand wheel actuator disclosed is suitable for use in vehicles equipped with steer-by-wire steering, it can also be implemented in other environments, such as driving simulators, computer or arcade game actuators, etc. Accordingly, it is to be understood that the present invention has been described by way of illustration and not limitation.

We claim:

1. A hand wheel actuator for providing force feedback to a user, the actuator comprising:
   a steering shaft having an upper end configured for attaching a hand wheel, said steering shaft being supported by bearings such that is rotatable about its own axis;
   a position sensor detecting an angular displacement of said steering shaft from a selected origin and producing a signal indicative of said angular displacement;
   an electric motor;
   a transmission means operatively connecting an output shaft of said electric motor to said steering shaft; and
   a variable stopper stopping rotation of said steering shaft at an arbitrary location independent from actuation of said electric motor.

2. The hand wheel actuator of claim 1, said variable stopper comprising a magnetic rheological fluid device operatively connected to said steering shaft.

3. The hand wheel actuator of claim 2, wherein said variable stopper is configured to stop travel of said hand wheel when steerable road wheels have reached their steering limit and said hand wheel has not, a control unit passes a current through wiring in said magnetic rheological fluid device.

4. The hand wheel actuator of claim 3, wherein when said control unit detects that said hand wheel is rotated towards a center position, said control unit responds by cutting power to said wiring in said magnetic rheological fluid device.

5. The hand wheel actuator of claim 1, wherein stopping rotation of said steering shaft at an arbitrary location is in response to signals from a control unit.

6. The hand wheel actuator of claim 5, wherein said control unit is programmed to employ said variable stopper in situations responsive to excessive at least one of yaw, lateral acceleration, understeer, oversteer, overturning, and vehicle speeds.

7. The hand wheel actuator of claim 5, wherein said control unit is independently communicated with said electric motor and said variable stopper.

8. The hand wheel actuator of claim 1 further comprising a spring-biased mechanical return-to-center device for providing resistance against turning said steering shaft away from a central position, said mechanical return-to-center device being operatively connected to said steering shaft.

9. The hand wheel actuator of claim 1 farther comprising a positive travel end stopper limiting angular displacement of said steering shaft to a selected limit.

10. The hand wheel actuator of claim 9 wherein said selected limit is ±540°.

11. The hand wheel actuator of claim 1, wherein said electric motor is operably connected to said upper end of said shaft while said variable stopper is operably connected to a lower end of said shaft opposite said upper end.

12. The hand wheel actuator of claim 1, wherein said variable stopper is configured to stop travel of said hand wheel when steerable road wheels have reached their steering limit.

13. A method for feedback in a steering actuator comprising:
   detecting an angular displacement of a steering shaft from a selected origin and producing a signal indicative of said angular displacement;
   operating an electric motor operatively connected to said steering shaft in response to signals from a control unit; and
   stopping rotation of said steering shaft at an arbitrary location in response to signals from a control unit independent from actuation of said electric motor.

14. The method of claim 13, wherein
   said stopping comprises applying a magnetic field to a magnetic rheological fluid device operatively connected to said steering shaft.

15. The method of claim 13 further comprising providing resistance against turning said steering shaft away from a central position using a spring-biased mechanical return-to-center device that is operatively connected to said steering shaft.

16. The method of claim 13 further comprising limiting angular displacement of said steering shaft to a fixed selected limit using a positive travel end stopper.

17. The method of claim 16 wherein said fixed selected limit is ±540° from a central position.

* * * * *